United States Patent [19]
Garrett

[11] 3,835,528
[45] Sept. 17, 1974

[54] SPHERE AND ANGLE TURNING ATTACHMENT FOR MILLING MACHINES

[75] Inventor: Wayne O. Garrett, Amelia, Ohio

[73] Assignee: Hansco, Inc., Cincinnati, Ohio

[22] Filed: Sept. 10, 1973

[21] Appl. No.: 395,957

[52] U.S. Cl............... 29/560, 29/27 A, 82/12, 90/DIG. 1, 144/1 C
[51] Int. Cl............................................. B23p 23/02
[58] Field of Search............... 29/560, 27 R, 27 A; 90/DIG. 1; 82/12; 144/1 C

[56] References Cited
UNITED STATES PATENTS

| | | | |
|---|---|---|---|
| 1,144,744 | 6/1915 | Wheeler | 29/27 R |
| 1,510,167 | 9/1924 | Wilhelm | 29/27 A |
| 1,980,444 | 11/1934 | Scott | 82/12 |
| 2,341,061 | 2/1944 | Rhodes et al. | 90/DIG. 1 |

*Primary Examiner*—Leonidas Vlachos
*Attorney, Agent, or Firm*—Wood, Herron & Evans

[57] ABSTRACT

Machinery for cutting spherical and other surfaces of revolution on a workpiece while the latter is rotated about its longitudinal axis. The cutting tool is carried by a tool post mounted on a table which is both positionable along X-Y axes in its plane and swingable about an axis perpendicular to the axis of the workpiece. This table is in turn carried by another table which is independently shiftable so that the axis of tool swinging movement may be shifted with respect to the axis of workpiece rotation.

A post or spindle is provided for rapid set-up of the tool with respect to the axis about which it is swung, the post being shiftable along an axis perpendicular to the surface of the table on which the tool is carried, between a position at which it is remote from the tool, and a set-up position in which its side surface can be engaged by the cutting edge for accurate positioning of the latter.

13 Claims, 7 Drawing Figures

SPHERE AND ANGLE TURNING ATTACHMENT FOR MILLING MACHINES

This invention relates to machinery for turning surfaces of revolution such as spherical, conical, aspherical and parabolic surfaces on a workpiece which is rotated about a longitudinal axis. More specifically, the invention relates to structure which can be mounted to a milling machine, preferably a vertical milling machine, whereby such shapes may readily be cut with a high degree of speed, accuracy and versatility.

Specialized machines have previously been made by which spherical surfaces can be generated, and which are particularly adapted for use in connection with the manufacture of lenses. Such surfaces are required, for example, to form the laps which are used for grinding and polishing both concave and convex lenses and lens molds. Such machines are shown in U.S. Pat. Nos. 1,408,305; 1,513,883; and 1,803,429. In general, they are highly specialized and are of limited versatility.

Radius cutter attachments for lathes and other machines have previously been known, as shown in U.S. Pat. Nos. 2,367,574; 2,933,965; and 3,447,245. In U.S. Pat. No. 3,498,161, axial movement of a tool with respect to its carriage is accomplished by a separate feed, and the entire cutter head carriage can also be moved by the main feed of the machine. That patent requires tool positioning by reference to a gauge block mountable to the tool holder, and the range and type of tool movement is limited.

The object of this invention has been to provide an attachment for use with a conventional milling machine or the like, which can rapidly be set up to cut accurately to predetermined dimensions, radii of curvature, and arc angles, and which will enable a wide range of spherical and other complex surfaces to be turned.

In radius and angle cutting devices of the type to which this invention is directed, the workpiece is rotated about a longitudinal axis, and the bit is swingable along a circular path lying in a plane which contains the axis of workpiece rotation, or alternately along a straight line in that plane. In order to form a spherical surface of accurately predetermined radius, the bit or tool must be so positioned that its tip is spaced at an accurately known distance from the center about which it is swingable. It is desirable to be able to advance the cutter into the workpiece, to take successively deeper cuts as the latter is rotated, without varying the constancy of this radius.

One of the major advantages of this invention is that it enables spherical surfaces of different but accurately predetermined radii, to readily be cut by a modification of a conventional basic machine. The invention is especially useful, in its preferred form, as an attachment for a milling machine, grinder, or other machine having a positionable table and a spindle ordinarily used for carrying a rotary driven cutter. The spindle is used to mount a post which is then used as an accurate, translatable, point of reference for tool set up. A drive unit separate from the usual spindle drive is provided for rotating the workpiece about its axis.

In accordance with the invention, a machine is provided having a first table which is positionable in its plane. A second table is mounted to and positionable with the first table. A post is positioned perpendicularly to the surface of the second table, and is mounted so as to be translatable or shiftable toward and away from the second table. The second table is rotatable relative to the first table, about an axis which is parallel to the axis of the post and thus perpendicular to the surface of the second table. Means are also provided for positioning the second table lineally relative to the first table, in an X-Y frame of reference. A tool mount on the second table moves with the latter, and a tool carried by the mount is shiftable with respect to the second table. A workpiece support mounts a workpiece for rotation about an axis parallel to the surface of the second table for cutting by the tool. Drive means are provided for rotating the workpiece about its axis.

The invention can best be further described by reference to the accompanying drawings, in which:

FIG. 2 illustrates the tool bit being positioned with respect to the vertical axis of rotation about which it is swingable;

FIG. 3 is similar to FIG. 2 but shows the tool bit positioned to be swung about a vertical axis for cutting a convex spherical surface of predetermined radius; and FIG. 4 shows the tool bit in engagement with a workpiece, for cutting a convex spherical surface;

Figure 5:
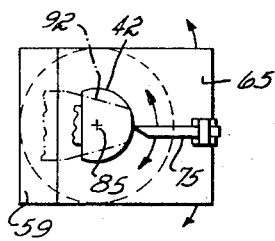
Figure 6:
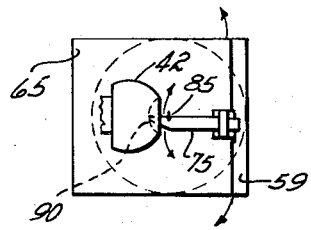
Figure 7:
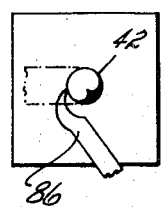

and FIGS. 5, 6 and 7 are diagrammatic plan views of the tool bit and workpiece and show different cutting operations, specifically:

FIG. 5 illustrates formation of a convex spherical surface;

FIG. 6 illustrates the formation of a convex spherical surface with a smaller concave spherical surface at one end thereof; and FIG. 7 illustrates the manner in which a complete sphere can be turned.

As previously suggested, the radius cutter of this invention is preferably utilized on a vertical milling machine, although those skilled in the art will appreciate that it can be used on other machines. In the structure shown in FIG. 1 for purposes of explanation, the vertical milling machine designated generally at 10 is, except for modifications made therein in accordance with the invention, of the well-known "Bridgeport"type. The machine 10 includes a base 11 from which a column or frame 12 projects upwardly. Column 12 is provided with vertical ways or guides 13, and a carriage or knee 14 is mounted to and slidable along the ways 13 to different vertical positions. The position of knee 14 can be adjusted by an elevating crank 15, which operates elevating mechanism not shown that may be conventional.

Knee 14 is provided with horizontal ways 20 that extend perpendicularly to the vertical ways 13. A saddle 21 is positionable lineally along ways 22 by means of a saddle feed crank 22. Saddle 21 is provided with horizontal ways 24 that are transverse to the ways 20, and a first table 25 is lineally movable along the ways 24. Table 25 is shiftable by a table feed crank 26. Thus, the first table 25 is positionable horizontally within an X-Y frame of reference by means of the two positioning means 22 and 26 that are oriented at right angles to one another.

At the upper end of column 13 there is mounted an overhead or cantilever arm assembly 30 which includes a vertically shiftable quill or spindle 31 into which a rotary cutter would conventionally be mounted for conventional milling operation. Spindle 31 can be shifted vertically by a lever 32. The spindle would conventionally be rotated by drive means indicated generally at 33, but in accordance with this invention, this drive does not rotate the spindle or the bit by which the spherical surface is formed, and it is not a part of the invention.

Figure 1:
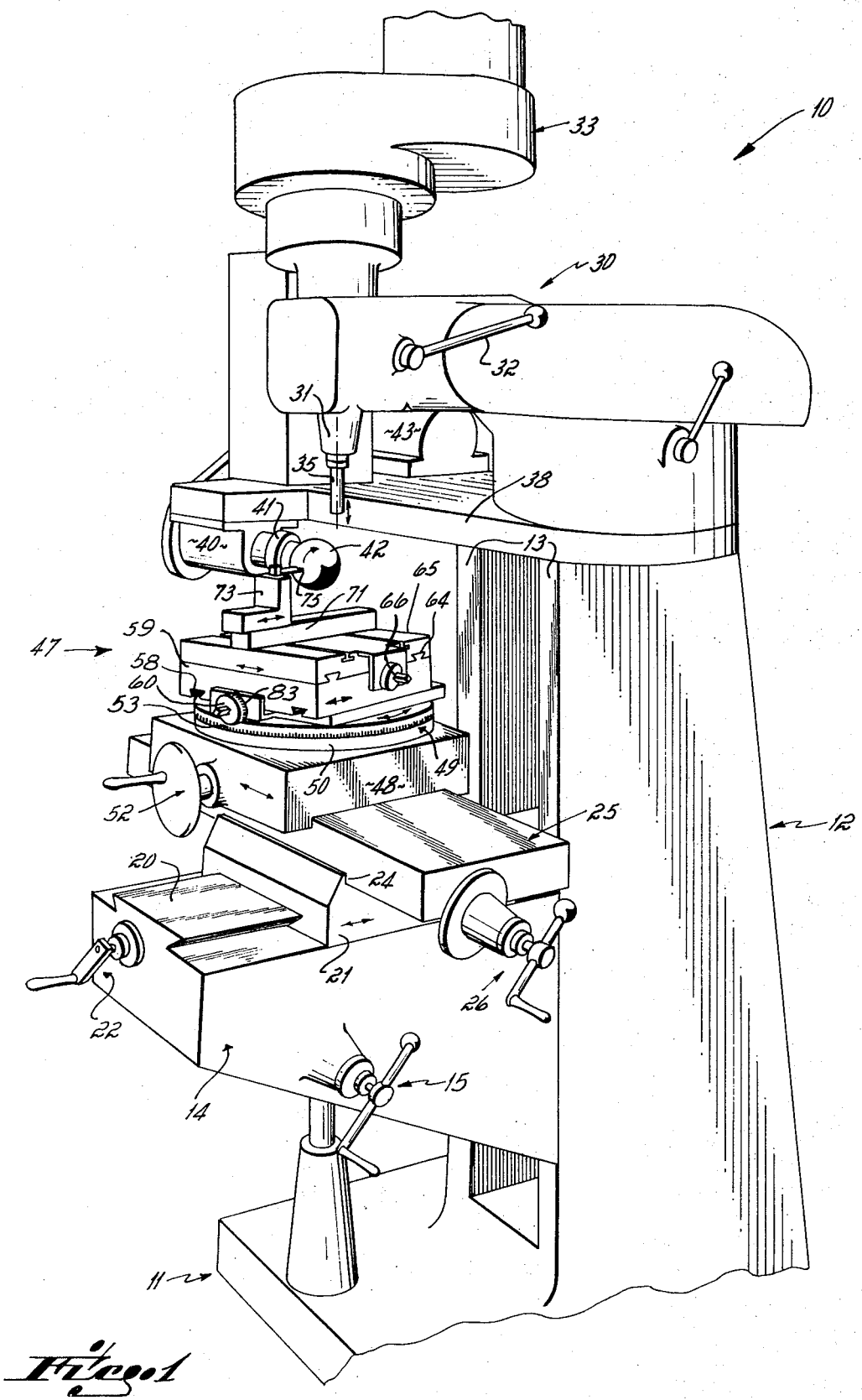
FIG. 1 is a perspective view of a preferred form of the invention as incorporated in a vertical milling machine.

The numbered elements described above with reference to FIG. 1, are generally conventional and are well known to those skilled in the art. A more complete description of those elements, and of the associated internal mechanisms which are not shown in FIG. 1, is given in full detail in Manual No. M-105, published by Bridgeport Machines, Bridgeport, Connecticut, to which reference is hereby made.

In accordance with this invention the overarm 30 is not used to position or rotate a cutter, but instead to position a vertically adjustable reference post 35 which is mounted or chucked to the spindle 31. Post 35 is not necessarily rotated in use and does not provide a cutting action. It will be apparent, therefore, that other structures for supporting the vertically shiftable post 35 can be used in place of that shown. However, as will appear, the mechanism shown is extremely useful because it facilitates rapid and convenient set up of the tool for cutting a sphere of desired radius.

A generally flat side arm or plate 38 is mounted to column 12, sandwiched in position between the top of the column and the overarm 30. This side arm 38 projects to one side of the column 12, and below it mounts a workpiece support 40 having a chuck 41 for holding a workpiece 42. The chuck 41 is rotatable with respect to support 40 about a horizontal axis 76 (see FIG. 2) that is generally parallel to the direction of the first table feed means 26. This overhead mounting of workpiece 40, as will be seen, provides clearance below the support and workpiece for swinging the tool bit and its mounting. Chuck 41 is rotated by a drive means such as a motor 43 mounted on the side arm 38. Although the basic environment is preferably a vertical milling machine, the workpiece thus rotates about a horizontal axis and is engaged by a tool, more in the manner of a lathe.

Mounted to first table 25 is an assembly designated generally at 47. This assembly includes a bed 48 which carries an index head 49 that can be rotated by conventional mechanism (not shown) about a vertical axis with respect to table 25. The rotating drive may be operated by a crank 52. Index marks at 53 are provided around the index head 49, by which the angular position of the head may be determined with reference to a fixed plate 50 on bed 48. A set of horizontal ways 58 are provided on the index head 49. An upper saddle 59 is slidable along the ways 58, and is positionable lineally along those ways by an upper saddle feed screw 60. A drive handle is mountable to feed screw 60 but has been omitted in FIG. 1 for clarity. Upper saddle 59 in turn is provided with ways 64 on its upper surface, the ways 64 extending at right angles to the ways 58. A second table 65 is mounted on the ways 64 and is slidable on them, with respect to the upper saddle 59, by means of a feed screw 66, the operating handle for which has again been omitted for clarity. Thus, second table 65 is horizontally positionable with respect to the index head 49 in an X-Y frame of reference, and this positionability is separate from the positionability of the first table 25.

The surface of second table 65 may be provided with T-shaped mounting slots, and a tool guide generally at 71 is mounted to this second table. The tool guide 71 presents a way which extends parallel to the direction of movement of feed 60, and a tool mount or post 73 is slidable along that way. The tool mount 73 is provided with means for receiving and holding a tool which in this embodiment is a bit 75, for cutting a workpiece 42 in use. (It should be noted that the tool may alternatively comprise a grinder, and the term "tool" is used herein generically.) The vertical position of the tool, with respect to the axis 76 of workpiece 42, can be adjusted by means of the knee elevating crank 15, it being desirable that the cutting action take place in a plane which passes through and includes the axis 76. It can also be seen that the tool is lineally shiftable in the horizontal plane by moving either the first table 25 or second table 65, and that the tool can be rotated about a vertical axis by turning index head 49.

Figure 2:
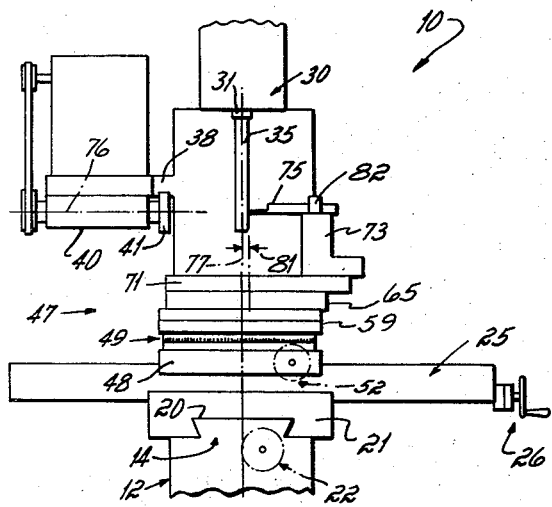
FIGS. 2, 3 and 4 are a series of diagrammatic front elevations that show the sequence of steps for setting up for forming a spherical surface with the machine shown in FIG. 1, specifically.
Figure 3:
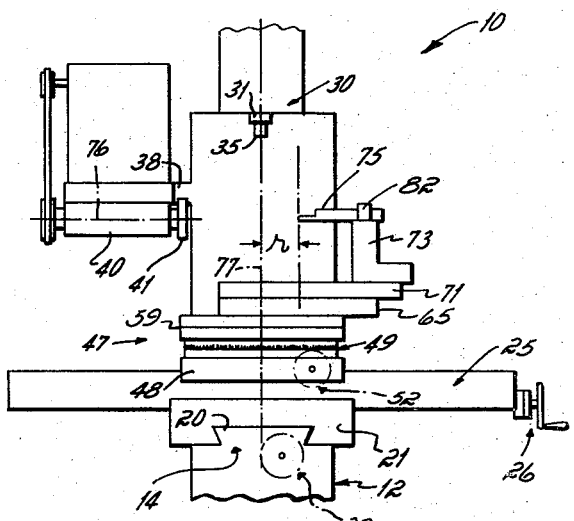
Figure 4:
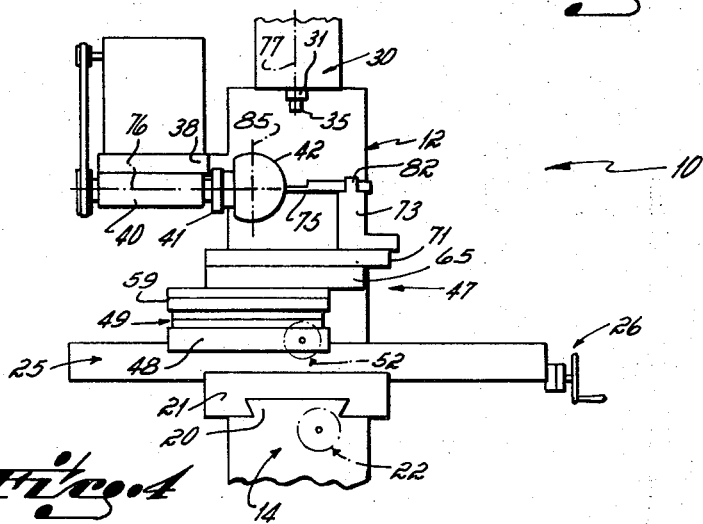

The set up and cutting procedure for turning a convex spherical surface of a predetermined desired radius is shown diagrammatically in FIGS. 2, 3 and 4. The tool 75 is mounted to tool mount 73, and knee elevating crank 15 is turned to bring the cutting edge of the tool in the horizontal plane which contains the axis 76 about which workpiece support 40 rotates. This is done by positioning the knee vertically so that the cutting edge of the tool just touches the lower edge of the workpiece, then elevating the knee and hence the tool by an amount equal to one-half the diameter of the workpiece.

The horizontal spacing between the cutting edge of the tool and the vertical axis about which the second table 65 rotates will determine and correspond to the radius of the spherical surface which is to be cut. A desired spacing is obtained by use of the post 35, which for this purpose is lowered by lever 32 from the withdrawn or raised position shown in FIG. 1 to the set-up position shown in FIG. 2, where the surface of the post can be "touched" by the cutter 75.

Cranks 22 and 26 are turned to bring their respective components to their center positions. Crank 52 is turned to rotate second table 65 to a zero or aligned angular position at which the upper saddle ways 58 are parallel to the axis 76 of the workpiece support 40 and the direction of movement of first table feed 26. In this orientation the ways 64 of second table 65 will be parallel to the knee ways 20. By rotating the second table feeds 60 and 66, the second table is centered at a predetermined zero position with respect to the index head. Feed 60 is then backed off so that second table 65 is moved away (to the right, as viewed in FIG. 2) from the axis 77 of post 35, by a mount corresponding to one-half the diameter of that post. This corresponds to the displacement designated by 81 in FIG. 2 (note that the axis of rotation of head 49 remains aligned with post axis 77). Bit 75 is then advanced, with respect to the tool post 73 (or alternatively, the post is slid along guide 71) until the cutting edge just touches the side of post 35. This positions the cutting edge at a known distance from the axis about which the second table 65 is rotatable. The bit edge is also on the axis 76 of workpiece rotation. The bit is then clamped in this position, as by the clamping screw 82 which secures it to the post 73. By reference to the dial 83 of feed 60, second table 65 is backed off further (i.e., moved to the right, with reference to FIG. 3) a distance or corresponding to the desired radius of the spherical surface to be cut, less one-half the diameter of post 35. The cutter tip is now spaced from vertical axis 77 (and the axis of rotation of index head 49, which is aligned with axis 77) by an amount corresponding to the desired spherical radius, and it will be seen that if second table 65 is then rotated about axis 77 (by turning rotating drive handle 52) the cutter tip will describe a horizontal arc about that vertical axis.

A workpiece 42 is now placed within the chucking attachment 41 on workpiece support 40, and the first table longitudinal feed 26 is turned to advance the entire first table, and the table assembly on it, toward the workpiece. This movement does not change the spacing between the cutting edge and the axis of second table rotation. That is to say, the effect of this shifting movement is to translate that axis leftward and thereby bring the bit 75 closer to the workpiece. When the bit 75 is in cutting engagement with the end of the workpiece, rotation of crank 52 causes it to swing on an arcuate path around the workpiece thereby to cut a spherical surface. Successively deeper cuts are taken by incrementally advancing the first table feed 26, without changing the position of the second table with respect to the first, repeatedly until the final spherical surface has been formed as shown in FIG. 4. FIG. 5 illustrates the swinging movement of bit 75 about axis 85 of head 49 when the rotating crank 52 is turned. It is apparent that the overhead movement of workpiece support 40 provides clearance beneath it so that the bit 75 can be swung under the support, to positions that would not otherwise be possible. Also, this arrangement enables spheres of large radii to easily be cut, simply by using a high tool post 73 and lowering the tables by crank 15.

The mechanism of this invention can be used to cut complete spherical surfaces, as well as partial spheres. In FIG. 7, a use of a hook-shaped or J-shaped bit 86 is shown. Use of this bit enables a complete spherical ball to be turned, since it can cut between the sphere and the chuck 41 as shown, to sever the sphere from the stock.

In the foregoing description, the cutting edge of the bit has been referred to as being spaced to the right (as appears in the drawings) of the vertical axis 85 about which it rotates (see FIG. 5). In this bit position, the surface cut will be a convex surface. When, as shown in FIG. 6, the cutting edge is positioned to the left side of the second table axis of rotation 85, it can be used to cut a concave spherical surface, as designated by the dotted line 90 in FIG. 6. Thus, both concave and convex surfaces can be formed, which may be of different radii as shown in FIG. 6.

A further advantage of the invention is that it facilitates the forming of a spherically rounded end of predetermined arc angle and which joins a conical surface with an accurately predetermined apex angle as shown by the dotted line 92 in FIG. 5. This can be done by turning a spherical surface 91 to whatever arc angle is desired and then, without changing the angular position of the bit, advancing the bit lineally by means of one or the other of the feed mechanisms 60 or 66 to form the conical surface of the desired apex angle.

In its ability to easily be changed from one radius to another, this machine offers a real advantage in set-up time. In the past such changes have often had to be made by use of dial indicators, micrometers, or gauge blocks. Here, in contrast, given the setting of dial 83 and the radius dimension which the bit will cut at that setting, a different radius can be dialed directly. Moreover, when the bit is removed for regrinding, etc., a replacement bit can easily be set up by shifting the alignment post 35 from the raised or remote position, to the set-up position and bringing the cutting edge into light touching contact with it, in the manner previously described. The fact that the alignment post can be translated along its axis, without loss of alignment, greatly facilitates this operation. When the post is removed from the spindle, a conventional milling cutter can be mounted if desired.

Having described the invention, what is claimed is:

1. A machine for forming spherical surfaces, said machine having a first table,
    means for positioning said first table in its plane,
    a second table parallel to and mounted on said first table for movement therewith,
    a post having an axis which is perpendicular to the second table,
    means mounting said post so that it can be shifted along said axis toward and away from the second table,
    means for rotating said second table about an axis parallel to the axis of said post,
    means for lineally positioning said second table relative to the first table,
    a tool mount on said second table and shiftable with respect thereto,
    a tool carried by said tool mount,
    a workpiece support for mounting a workpiece for rotation about an axis parallel to said second table for cutting by said tool,
    drive means for rotating said workpiece,
    and means for moving the first and second tables in a direction parallel to the axis of said post.

2. The machine of claim 1 wherein said workpiece support is suspended above said second table, the latter being horizontal, and said second table is movable beneath said support for cutting workpieces mounted by the support.

3. In a machine having a frame mounting a spindle which is shiftable along its axis toward the surface of a first table, and means for positioning said first table in an X-Y frame of reference perpendicular to said spindle, the improvement comprising,
    a second table parallel to and mounted on said first table for movement therewith,
    means for rotating said second table about an axis parallel to said spindle,
    means for positioning said second table in an X-Y frame of reference relative to the first table,
    a tool mount on said second table and a tool carried by said mount and shiftable with respect to the second table,
    a post mounted axially by said spindle and shiftable therewith to a position at which the post can be touched by said tool thereby to provide a reference position for aligning said tool,
    a workpiece carrier for mounting a workpiece for rotation about an axis parallel to the surface of said first table, for cutting by said tool, and drive means for rotating said workpiece.

4. The improvement of claim 3 wherein said machine is a milling machine.

5. The improvement of claim 4 wherein said post is vertically oriented, and the first and second tables are horizontal tables.

6. The improvement of claim 3 wherein the means for rotating the second table comprise an index head between the first table and the second table, for rotating the second table with respect to the first table.

7. The improvement of claim 6 wherein the means for positioning the second table are mounted to and carried by the means for rotating the second table.

8. The improvement of claim 3 wherein the tool is shiftable with respect to the second table in a direction parallel to the means for positioning the second table in one of the X-Y directions.

9. The improvement of claim 3 wherein the means for positioning the first table, and the means for positioning the second table each comprise a pair of feed screws at right angles to one another.

10. The improvement of claim 3 wherein the machine is a vertical milling machine and the workpiece support is suspended from an arm projecting outwardly from said frame and overhanging said second table.

11. The improvement of claim 10 wherein said spindle is adapted for receiving a rotary cutter for milling, and said post is mounted to said spindle in place of a rotary cutter.

12. The improvement of claim 11 wherein said spindle is shiftable between a raised position remote from said tool, and a lowered position in which said tool can be moved relative to said second table to engage the side of said post, thereby to position said tool at known position.

13. The improvement of claim 3 which further includes means for moving said first table along the axis of said spindle, toward and away from the axis of said workpiece support.

* * * * *